(No Model.)
F. F. BRYANT.
EGG BOILER OR COOKER.
No. 451,166. Patented Apr. 28, 1891.
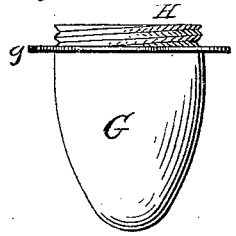
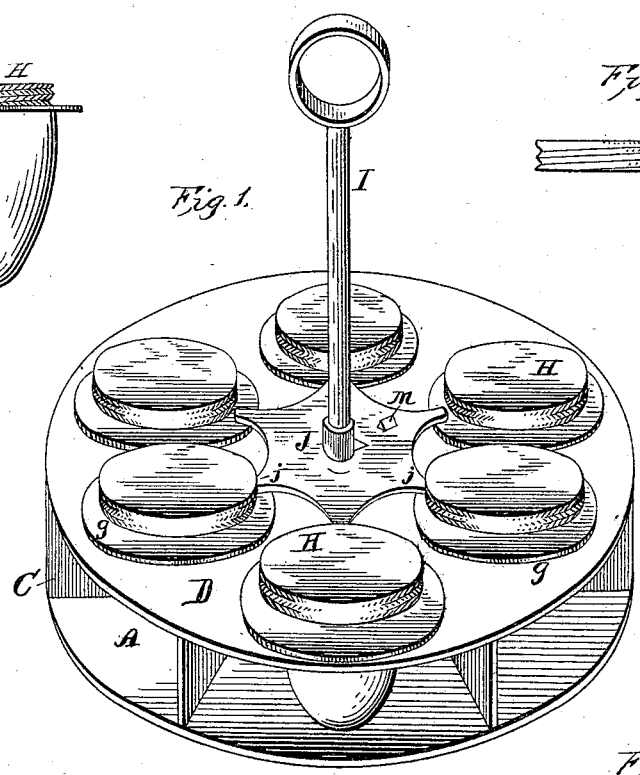
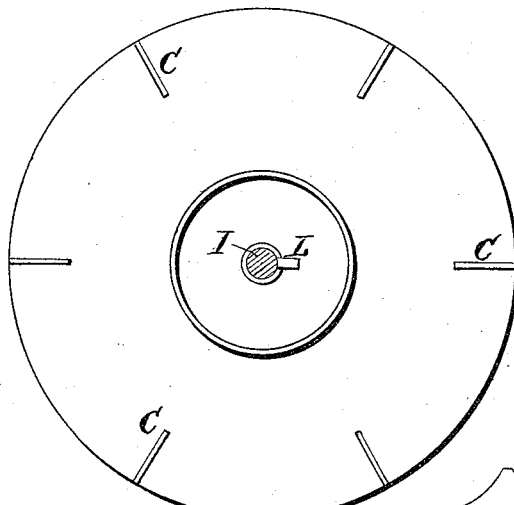
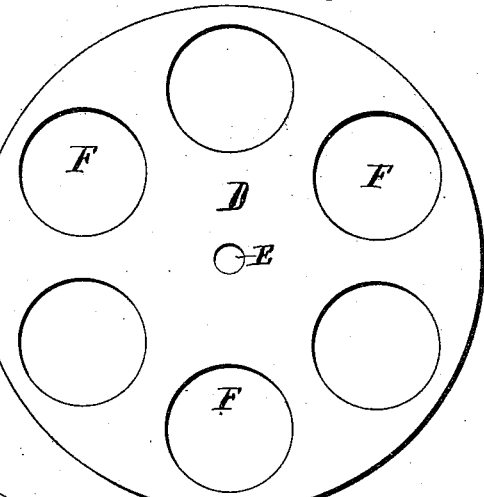
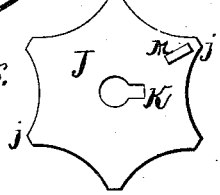
WITNESSES:
E. C. Duffy
S. Brashears Jr.
INVENTOR
F. F. Bryant
BY S. Brashears
ATTORNEY.

UNITED STATES PATENT OFFICE.

FANNY F. BRYANT, OF LINCOLN, KANSAS.

EGG BOILER OR COOKER.

SPECIFICATION forming part of Letters Patent No. 451,166, dated April 28, 1891.

Application filed October 8, 1890. Serial No. 367,462. (No model.)

*To all whom it may concern:*

Be it known that I, FANNY F. BRYANT, a citizen of the United States, residing at Lincoln, in the county of Lincoln and State of Kansas, have invented a new and useful Egg Boiler or Cooker, of which the following is a specification.

My invention is in the nature of a device whereby eggs may be boiled or poached after breaking them in suitable receptacles, whereby it is rendered possible to be absolutely assured that the egg is good before cooking it, and whereby it may be seasoned before cooking and inspected, if desired, during the operation of cooking to ascertain whether it is sufficiently well done.

My invention will be first fully described, and afterward specifically pointed out in the subjoined claims.

In the drawings, Figure 1 is a perspective view of my invention with all the parts in the position they assume when filled and adjusted ready for cooking the eggs. Fig. 2 is a top plan view of the lower plate with the ring and upright radial division and supporting plates, showing also the central stem in section. Fig. 3 is a plan view of the upper plate. Fig. 4 is a view of one of the egg-cups removed. Fig. 5 is a view of a screw-cap of an egg-cup. Fig. 6 is a view of the egg-cup-clamping plate.

Like letters of reference mark the same parts wherever they occur in the various figures of the drawings.

Referring to the drawings by letter, A is the bottom plate. It is circular in shape and provided with an upright ring B, soldered or otherwise secured thereto. It is further provided with a series of radial upright flanges C C, &c., of the same height as the ring B.

D is the upper plate, which is also circular and of the same diameter as the lower plate A. It is provided with a central aperture E, through which the stem F passes, and with a series of any suitable number of circular openings F, arranged in a circle around the center to receive a similar number of egg-cups, which may be either egg-shaped or ornamentally shaped to suit convenience or taste. This upper plate rests on top of the ring B and flanges C and is thus held at a proper distance from the lower plate when in use. The egg-cups G are provided with horizontal rims or flanges *g*, and are set into the holes F in plate D, with their rims resting on the plate at the margins of the holes. They are also provided with screw-caps H, so that they may be hermetically sealed.

I is a handle or stem which is screwed into the bottom plate A, so that it may be removed for packing or for cleaning the various parts of the device.

J is a locking-plate which is mounted loosely on the stem, so that it may be turned to bring its points *j* upon the rims of the egg-cups to hold them in position. This plate J has a central perforation or hole through which the stem passes, said hole having a notch K on one side to permit of its passage over a lug L on the stem, which lug, when the plate is turned so that it is not over the notch K, serves to hold the locking-plate in position to lock the egg-cups. A suitable projection M is formed on the locking-plate to turn it.

The eggs are broken and poured each into a cup. The cups are then sealed and placed in the holes F of plate D and locked therein by turning the locking-plate, as shown in Fig. 1, and the whole device immersed in boiling water a proper length of time to cook the eggs.

The advantages of this invention are evident. The eggs can be inspected before placing in the cups, so that no bad ones will be cooked. They can be seasoned before cooking and can be cooked to suit any taste.

Having thus fully described my invention, what I claim as new, and desire to secure by Letters Patent of the United States, is—

1. In combination, the plate D, having holes F, the egg-cups provided with laterally-projecting rims, the stem, and the locking-plate around the stem and engaging the rims of the egg-cups to lock them in position, as set forth.

2. The herein-described egg-boiler, consisting of the plate A, the plate D, supported at a suitable distance above said plate A, the stem screwed into the plate A, the egg-cups having lateral rims and resting in holes in plate D, and the locking-plate around the stem, engaging the rims of the egg-cups to hold them in position, as set forth.

FANNY F. BRYANT.

Witnesses:
WILLIAM W. DAVIS,
R. F. BRYANT.